May 4, 1943. R. S. SMITH 2,318,264
AIR ELIMINATOR FOR FLUID FLOW MECHANISMS
Original Filed Nov. 26, 1937  3 Sheets-Sheet 3
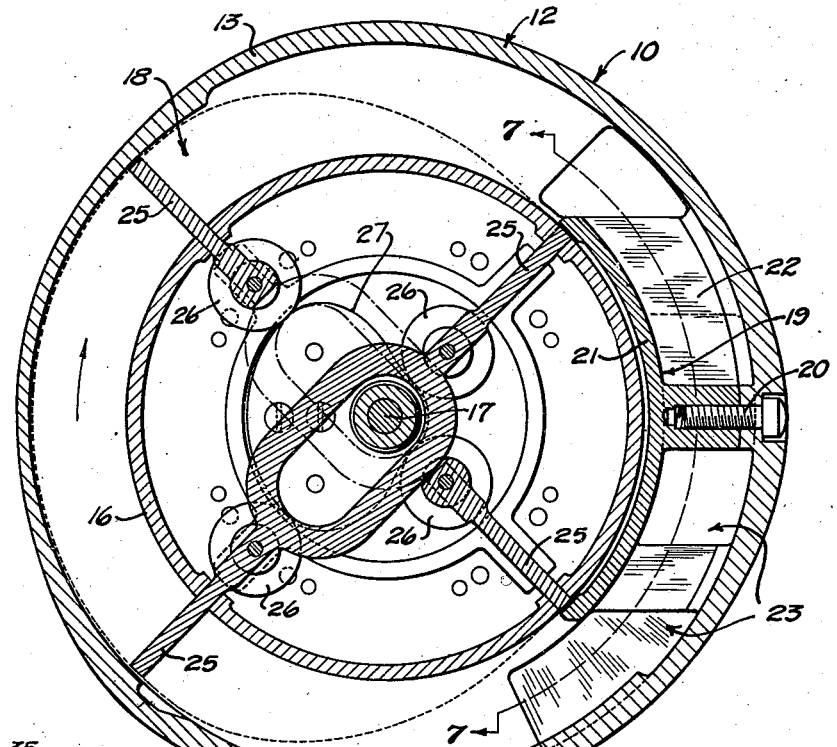
Fig. 3.
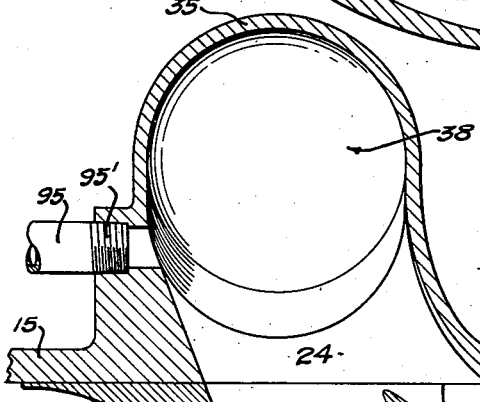
Fig. 7.
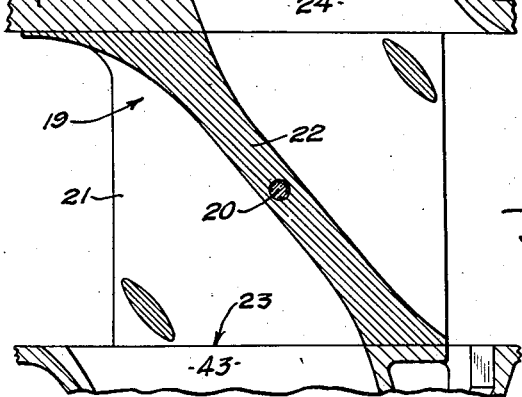
Inventor
Reuben Stanley Smith.
Attorneys.

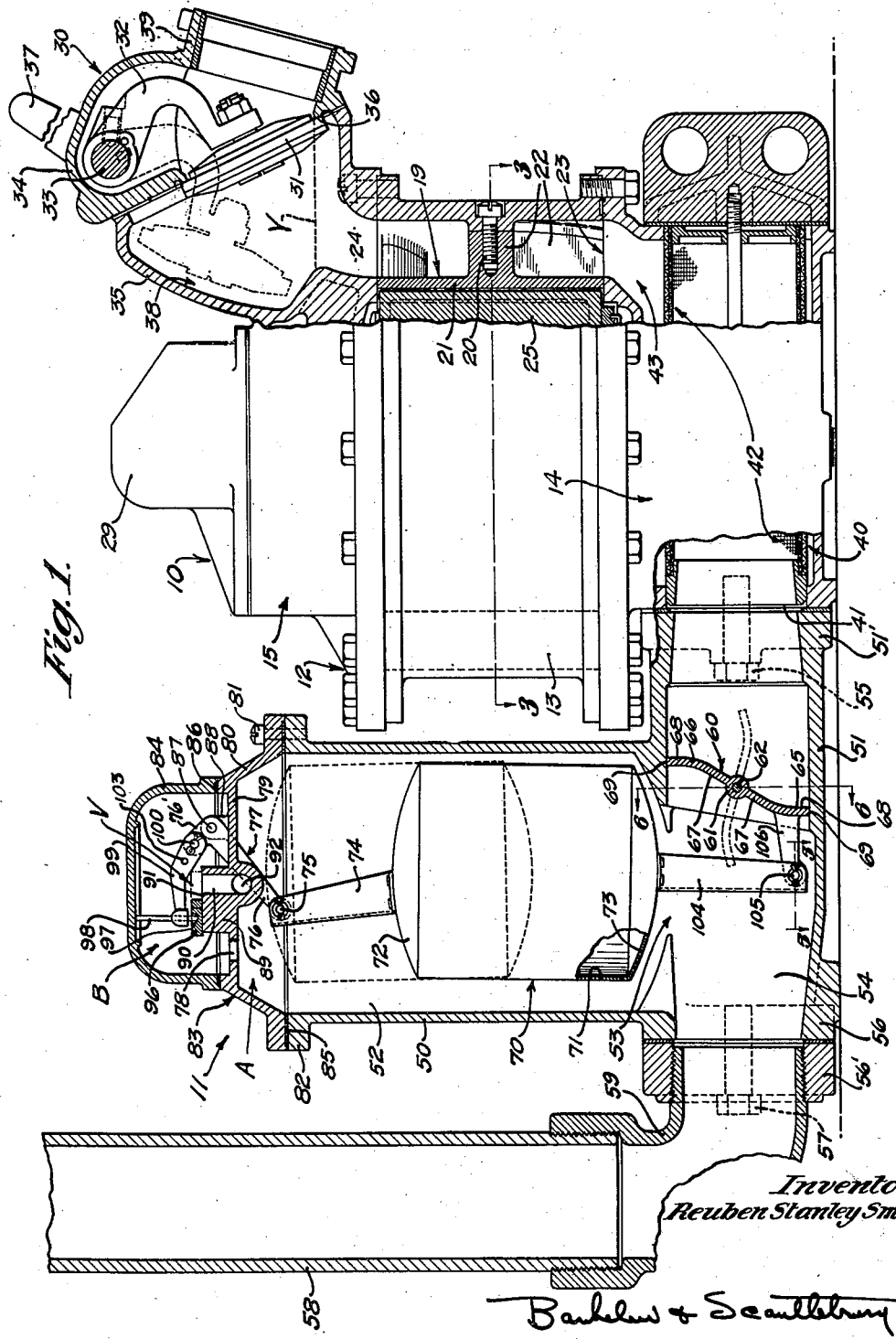

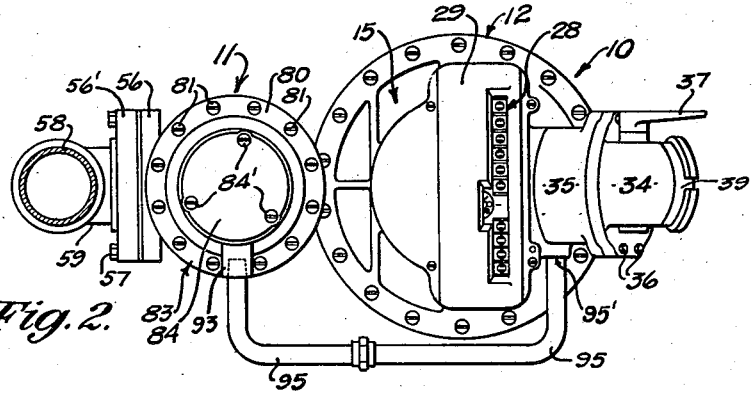
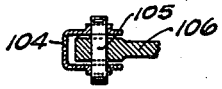
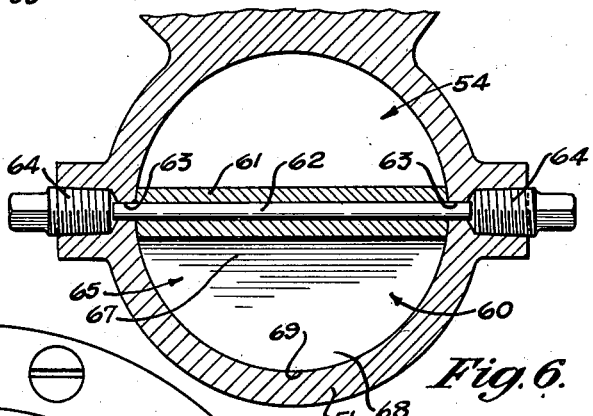
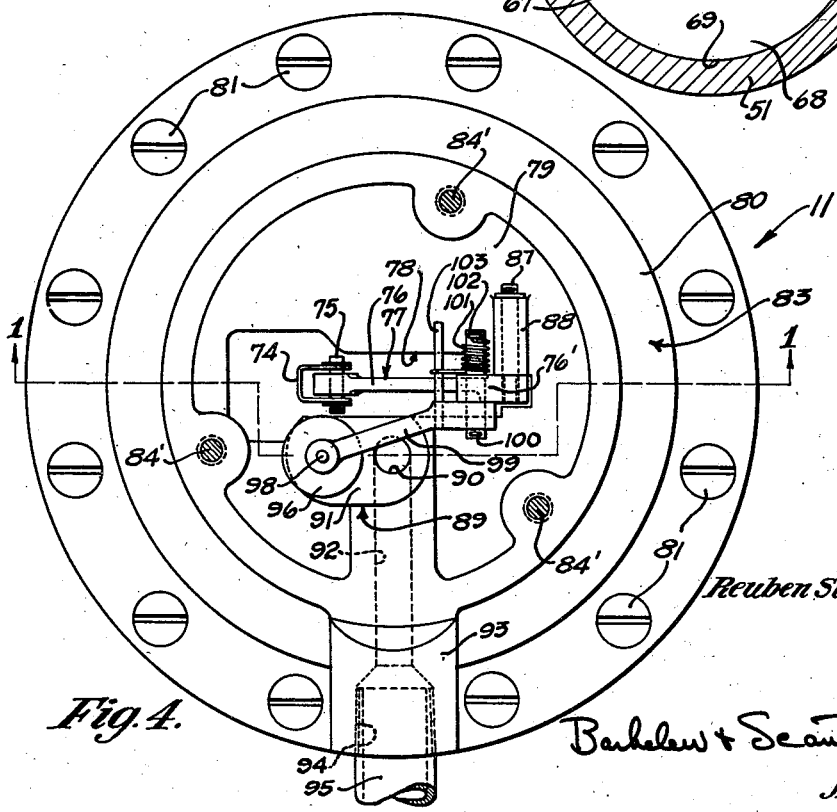

Patented May 4, 1943

2,318,264

UNITED STATES PATENT OFFICE 2,318,264

AIR ELIMINATOR FOR FLUID FLOW MECHANISMS

Reuben Stanley Smith, Altadena, Calif., assignor to Smith Meter Company, Los Angeles, Calif., a corporation of California Original application November 26, 1937, Serial No. 176,573. Divided and this application June 17, 1940, Serial No. 341,075

2 Claims. (Cl. 137—69)

This invention relates generally to air eliminators and fluid-flow control devices, and is a division of my copending application Serial No. 176,573, filed November 26, 1937, entitled Fluid flow mechanism, now Patent No. 2,263,145, issued November 18, 1941.

While the invention may be applied with advantage to and utilized in combination with fluid flow mechanisms of different types, it is particularly well adaptable to utilization in connection with liquid meters, in which situation it serves to free and withdraw entrained air from the liquid stream before that stream passes to the measuring chamber of the meter, thus preventing the obviously undesirable inclusion of air in the measurement-registration of liquid flow.

The general object of the invention is to provide relatively simple, but surely and accurately acting means whereby the separation and disposal of the originally entrained air may be accomplished with great efficiency.

Other objects and features of novelty may be made more clearly apparent in connection with the following detailed description, reference being had to the accompanying drawings, wherein:

Fig. 1 is a medial sectional view of my improved device, with a portion of the associated meter shown in elevation, the section through the cap of the air eliminator being taken on line 1—1 of Fig. 4;

Fig. 2 is a reduced, top plan view of Fig. 1;

Fig. 3 is an enlarged section on line 3—3 of Fig. 1;

Fig. 4 is an enlarged plan view of the air eliminator with the head-cap removed;

Fig. 5 is a fragmentary section on line 5—5 of Fig. 1;

Fig. 6 is a section on line 6—6 of Fig. 1; and

Fig. 7 is a fragmentary section on line 7—7 of Fig. 3.

The meter, proper, is indicated generally at 10, while the air-eliminator and flow control is generally indicated at 11.

The meter may be of any suitable type, and the fact that it is here illustrated as corresponding generally to the meter described in said application Serial No. 176,573 is not to be construed as in any way limitative. I have shown and will describe only sufficient structure to enable me to explain the association of the air-eliminator with certain typical meter parts and to explain the path of fluid flow and certain fluid levels insofar as they are concerned with the operation of the eliminator.

The illustrated meter is of the rotary type wherein blades are shuttled successively across and sweep through the flow channel during rotation of the blade-supporting rotor. The meter casing generally indicated at 12 includes a vertically arranged barrel 13 closed at its bottom and top by detachable end walls made up of base and cover 14 and 15, respectively. Rotor 16 is mounted concentrically within barrel 11 by shaft 17, the annular space 18 thus defined by the rotor and casing comprising the flow channel of the meter. Dividing block or barrier 19 is interposed in the flow channel, being secured to barrel 13 at 20, and comprises an arcuate plate portion 21 and a diagonal partition wall 22 (Fig. 7).

Opening to flow channel 18 near the bottom of and at one side of wall 22, is inlet passage 23, while the flow channel opens at the top and opposite side of wall 22 to the substantially vertically extending outlet passage 24 provided in the cover member 15 of the meter housing.

Blades 25 are supported by rotor 16 and are adapted to be projected across the flow channel while opposite barrier 19, and then to be retracted to clear the barrier, by co-action between the blade-carried rollers 26 and the stationary cam 27, the fluid, in its passage through the flow channel acting against the projected blades to cause rotor-rotation. It is unnecessary for the purpose of this application to describe any of these elements or their operation in detail, as they play no part in the present invention except insofar as they function in connection with the air-eliminator.

I have indicated generally at 28 a registration mechanism for indicating the amount of fluid-flow through the meter. It will suffice for the present purpose to state that suitable mechanism (not shown) is adapted to connect rotor 16 and registration mechanism 28 contained in counter housing 29 on cover 15, whereby that registering mechanism is adapted to indicate the amount of fluid flow. The registering mechanism is actually a rotor-revolution counter, it having been predetermined that the meter passes a certain volume of fluid per rotor-revolution and the counter having been calibrated in suitably correlated volumetric units.

The faucet valve for controlling the measured delivery of fluid from the meter, is generally indicated at 30. Full details of structure and operation of this valve, which is here illustrated merely as an example of one type of valve which may be used, are set forth and certain features thereof are claimed in my co-pending application entitled "Faucet valve," filed January 19, 1938, Serial No. 185,782.

It will suffice here to say that valve 30 includes a disk stopper 31 carried on an arm 32 extended from rock shaft 33. Shaft 33 is journalled in housing 34, the latter being secured to the off-set portion 35 of cover 15 by bolts 36. In closed condition (full lines of Fig. 1), disk 31 engages seat 36 on housing 34, while rotation of shaft 33 by external handle 37 operates to move the disk to the open position indicated in dotted lines, where it occupies off-set chamber 38 defined by housing-portion 35. Housing 34 has an outlet neck 39 to which attachment of a delivery pipe or line (not shown) is made. It will be seen that chamber 38 is in communication with outlet passageway 24 and that it lies at the meter side of disk 31 when the latter is in closed position.

Base 14 has a diametrically extending through-passage or screen chamber 40 whose inlet end, indicated at 41, serves as an inlet to the meter, proper. Within chamber 40 is a reduced-diameter, cylindrical screen assembly 42, the fluid entering inlet 41 passing longitudinally through the screen assembly and being filtered or screened as it passes radially outward into chamber 40, the latter having an upwardly opening passageway 43 which communicates with inlet passageway 23 and hence with flow channel 18.

Assuming valve 30 is open, the fluid traverses the following path: Inlet 41, screen 42, chamber 40, passageway 43, inlet passageway 23, flow channel 18, outlet passageway 24 and through the bore of neck 39 to point of delivery. As described briefly above, the fluid in its passage through flow channel 18 causes rotor-rotation and blade-shuttling, with the rotor-rotation imparting operative drive to the registering mechanism 28.

The air eliminator and flow regulator 11 includes a cylindrical barrel or casing 50 extending vertically from the integral and horizontally extending casing or pipe 51, the bore or float-chamber 52 of casing 50 opening at 53 to horizontal bore 54. One end of pipe 51 has an attachment flange 51' applied by bolts 55 to the side of meter base 14, whereby eliminator bore 54 is put into communication with meter-inlet 41. The opposite end of pipe 51 has a fitting 56' applied to its attachment flange 56 by bolts 57, the inlet or stand-pipe 58 being secured to fitting 56' by elbow 59.

Within pipe bore 54 at the right (Fig. 1) of float-chamber opening 53, is a flow-control valve 60 (Fig. 6). This valve, of the butterfly type, is circular, as viewed axially of the pipe, and is of a diameter to fit bore 54. It includes a horizontal hub 61 taking shaft 62 whereby the valve is mounted for oscillatory movement to and from closed position. Shaft 62 has bearing in bores 63 in the pipe-wall, while plugs 64 hold the shaft against end-wise displacement, one, at least, of the plugs being removed to allow assembly or disassembly of the valve and its shaft within bore 54.

Valve or disk 60 may be considered as made up of two blades 65 and 66, said blades lying at opposite sides of the vertical axial plane of shaft 62. In closed position each blade has a diagonally extending inner portion 67, while the outer portion 68 extends substantially vertically, the square-cut-ends 69 of the blades engaging pipe 51 as a positive stop to prevent counter-clockwise movement from the full-line position of Fig. 1 and thus establishing the closed position of the valve.

By reason of this offset arrangement of the valve blades, I overcome the depression effect usual to most valves of this type, which acts (as such valves are initially opened and by reason of the rapid fluid-flow past the end of one of the angularly disposed blades) in a manner tending to reclose the valve and thus materially to interfere with the nice balance necessary to successful operation of a float-operated butterfly valve throughout its various positions of adjustment.

Adapted to reciprocate vertically within float chamber 52 is a float 70 here shown as made up of a cylindric metal shell 71 whose ends are closed at 72 and 73. From top 72 extends a vertical leg 74 of channel cross-section (Fig. 4) which is pivotally connected at 75 to arm 76 of bell crank 77. Crank 77 extends through a slot 78 in plate 79 which is in an integral part of cap 80. Cap 80 is bolted at 81 to flange 82 of casing 50, and may be considered as making up a portion of the top closure or head generally indicated at 83. Head 83 is completed by cap 84, secured to cap 80 by bolts 84' (Fig. 2). Gaskets 85 and 86 are interposed between cap 80 and casing 50 at one side and caps 80 and 84, at the other side.

Bell crank 77 is pivotally supported by a pin 87 (Fig. 4) supported from plate 79 by boss 88. Also extending from plate 79 is an elongated boss 89 (Fig. 2) which has a vertical bore 90 extending from its upper machined face 91 to horizontal bore 92 which extends horizontally to boss 93 at the outer edge of the cap and which provides a threaded socket 94 for the reception of by-pass pipe 95.

Sliding on face 91 of boss 89, is a slide valve 96, which may be conveniently made up of a disk of such material as "Catalan." Disk 96 has a central socket 97 adapted to take the lower end of pin 98 which is carried by arm 99 pivotally connected at 100 to arm 76' of bell crank 77. Pivot pin 100 is extended to receive a coiled torsion spring 101, the looped extremities of which engage cotter key 102 carried by the pivot pin and transverse pin 103 carried by arm 99, respectively. The effect of this spring is to tend to rotate arm 99 in a counter-clockwise direction (as viewed in Fig. 1) so as always to pressurally engage disk 96 with face 91, said face and disk being lapped to insure full-area contact. Spring 101 thus acts to hold disk 96 flat against face 91 irrespective of the bodily left or right sliding movement imposed on that disk by virtue of bell crank movement, the fit between pin 98 and socket 97 being sufficiently free to allow slight rocking movement of the pin during such bell crank movement. The disk is also capable of rotation about the pin—thus giving it self-cleaning and self-lapping characteristics.

The upper end of pin 98 is extended into close proximity with the underface of cover 84, to prevent, during shipment or rough handling, a sufficient extent of clockwise movement of arm 99 as accidentally to dislodge pin 98 from socket 97.

It will appear that when float 70 rises from the full line of Fig. 1 to the dotted line position, bell crank 77 will be rotated clockwise, thereby bodily drawing arm 99 and disk 96 to the right and causing said disk to close off passageway 90.

Extending downwardly from float 70 is leg 104 of channel cross-section (Fig. 5) which is pivotally connected at 105 to crank arm 106 extending from and integral with valve 60. It will be seen that downward movement of the float is limited to the extent shown in Fig. 1 by reason of the contact of valve edges 69 with pipe 51. Likewise, it will be seen that the float is supported solely by its connection with valve arm 106 and with bell crank 76, there thus being no necessity for providing guides and guideways, or the like, common to most float valves, which are very likely to stick or bind the floats. Of course, in its vertical travel, the float will have a component of horizontal bodily movement but this is in no way disadvantageous since ample annular clearance is left between the float and the wall of the float chamber 52.

In the normal condition of the entire system and with faucet valve 30 closed, the meter will be completely filled with fluid and the fluid in chamber 52 will hold float 70 in its uppermost position (dotted lines in Fig. 1) wherein the air-outlet valve generally indicated at V, made up of boss 89 and disk 96, is closed, and regulator valve 60 is in the open position, both as indicated by dotted lines.

Air will be trapped in the air chamber A above the fluid in chamber 52, as well as in the valve chamber B. In this condition, valve 60 offers no appreciable resistance to the flow of fluid through bore 54 and thence through the meter to outlet 39 when faucet 30 is opened.

However, should there be air entrained in the incoming fluid, it will naturally seek to rise therethrough and, upon reaching a point below the float chamber will pass upwardly through the float chamber liquid and into air chamber A, it thus being trapped and prevented from passing through the meter to cause a false indication by counter 104.

As the air gathers within chamber A, it downwardly displaces the fluid within the float chamber and raises the air pressure within that chamber. The float drops as the fluid is displaced, thus shifting valve-disk 96 toward the left or full-line position in Fig. 1. As the float descends, it tends to move valve 60 toward closed position and this valve, in its partly closed position, acts as a baffle to more definitely direct the fluid with its entrained air into the float chamber, to give that air a better and longer opportunity to rise to chamber A.

When the air within the chamber has gathered to an extent sufficient to drop the float to a position where air-valve V is opened, the air, under its built-up pressure, will flow throuh passageway 90 and 92 into by-pass tube 95, and by this action chamber A will be drained of air sufficiently to allow fluid again to rise in the float chamber until valve V is again closed. So long as the incoming fluid contains entrained air, these intermittent air-releases will occur.

Broadly, by-pass pipe 95 may run to any point of delivery, but since it usually contains explosive vapors, it is preferred that it be led back into the line at a point beyond the measuring chamber of the meter. Accordingly, I have here shown pipe 95 as being tapped back into faucet-chamber 38 at 95' (Figs. 2 and 7). This particular manner of by-passing the air has a further advantage, for when the control valve 60 is in partly closed position, the rush of fluid through neck 39 will tend to create a depression about the outlet of the by-pass and thus aid in quickly and suddenly emptying chambers A and B of the excess air.

It will be noted that the elevation of outlet port 39 with reference to the flow channel 18 of the meter is such that when the fluid supply, to which pipe 58 is connected, becomes exhausted so that the level of such inlet fluid is depressed to a point substantially level with the outlet 39, as indicated by the dotted line Y, flow will cease, but the meter flow channel will have a sufficient volume of fluid trapped below this level to remain completely filled and thus exclude air from the meter channels and prevent drainage of the rotor chamber or other meter channels.

When the supply tank is refilled and additional fluid passes into the eliminator, the meter operation is resumed without inaccuracies of measurement which might exist if air had been admitted to the meter channels.

While I have shown and described a preferred embodiment of my invention, it will be understood that various changes in design, structure and arrangement may be made without departing from the spirit and scope of the appended claims.

I claim:

1. An air eliminator embodying a horizontal passageway having an opening in communication with a float chamber thereabove, a float in said chamber, there being an air chamber immediately above and in communication with the float chamber, an exhaust line leading from the air chamber, and a slide valve connected to and operated by said float and movable by float reciprocation to open and close said exhaust line, said slide valve embodying a block having a vertical passageway opening to the top surface thereof, a closure bodily slidable over the top of the block to and from positions closing said opening, a spring-actuated arm holding the closure in facial engagement with said top surface throughout its sliding stroke; and said slide valve connection including a bell crank operatively connected to said float and said arm.

2. In an air eliminator, a casing defining a substantially horizontal liquid-flow passage having an inlet and an outlet end, a float chamber above and in communication at its lower end with the passage between its inlet and outlet ends, and an air chamber above and in communication at its lower end with the float chamber; a float mounted for vertical reciprocation in said float chamber by virtue of changes in the liquid level therein, an exhaust line leading from the air chamber, and a valve connected to and operated by float reciprocation to open and close the exhaust line, said valve embodying a member having a port extending from one face thereof to said air chamber, a closure bodily slidable over said face to and from positions closing said port, a spring-actuated arm holding the closure in engagement with said face throughout its sliding stroke; and said slide valve connection including a lever pivoted to said casing, a connection between said float and said lever at one side of its pivotal point, and a connection between said arm and said lever at the other side of its pivotal point.

REUBEN STANLEY SMITH.